United States Patent
Weber

(10) Patent No.: US 10,995,704 B2
(45) Date of Patent: May 4, 2021

(54) FUEL DISTRIBUTOR FOR INTERNAL COMBUSTION ENGINES

(71) Applicant: Robert Bosch GmbH, Stuttgart (DE)

(72) Inventor: Ralf Weber, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/433,401

(22) Filed: Jun. 6, 2019

(65) Prior Publication Data

US 2019/0383237 A1 Dec. 19, 2019

(30) Foreign Application Priority Data

Jun. 18, 2018 (DE) .................... 102018209787.9

(51) Int. Cl.
| | | |
|---|---|---|
| *F02M 55/04* | (2006.01) | |
| *F02M 25/022* | (2006.01) | |
| *F02M 43/00* | (2006.01) | |
| *F02M 55/02* | (2006.01) | |
| *F02D 19/12* | (2006.01) | |

(52) U.S. Cl.
CPC ........ *F02M 25/0228* (2013.01); *F02M 43/00* (2013.01); *F02M 55/025* (2013.01); *F02M 55/04* (2013.01); *F02D 19/12* (2013.01); *F02M 2200/315* (2013.01)

(58) Field of Classification Search
CPC .............................. F02M 55/025; F02M 55/04
See application file for complete search history.

(56) References Cited

U.S. PATENT DOCUMENTS

| | | | | |
|---|---|---|---|---|
| 4,751,904 A | * | 6/1988 | Hudson, Jr. ......... | F02M 69/465 123/470 |
| 5,373,824 A | * | 12/1994 | Peters ................. | F02D 19/022 123/527 |
| 5,505,181 A | * | 4/1996 | McRae ............... | F02M 55/002 123/456 |
| 5,845,621 A | * | 12/1998 | Robinson ............ | F02M 55/025 123/456 |
| 6,205,979 B1 | * | 3/2001 | Sims, Jr. ............. | F02M 55/04 123/456 |
| 6,230,684 B1 | * | 5/2001 | Furuhashi ........... | F02M 55/025 123/456 |
| 6,314,942 B1 | * | 11/2001 | Kilgore .............. | F02M 55/025 123/467 |
| 6,321,719 B1 | * | 11/2001 | Schwegler .......... | F02M 55/04 123/456 |
| 6,354,273 B1 | * | 3/2002 | Imura ................. | F02M 55/04 123/456 |
| 6,371,083 B1 | * | 4/2002 | Rossi ................. | F02M 69/465 123/456 |

(Continued)

FOREIGN PATENT DOCUMENTS

DE 102014205179 A1 9/2015

*Primary Examiner* — Thomas N Moulis
(74) *Attorney, Agent, or Firm* — Norton Rose Fulbright US LLP; Gerard Messina

(57) ABSTRACT

A fuel distributor, for example that is usable as a fuel rail for mixture-compressing spark-ignition internal combustion engines, includes a main body, on which a plurality of high-pressure outlets are provided. The main body includes at least one dividing wall that at least largely separates an inflow region from a damping region within the main body. The main body is made up of at least two profiles that are joined to each other.

10 Claims, 2 Drawing Sheets

(56) References Cited

U.S. PATENT DOCUMENTS

| | | | | |
|---|---|---|---|---|
| 6,390,131 B1* | 5/2002 | Kilgore | F16L 55/04 123/456 |
| 6,463,911 B1* | 10/2002 | Treusch | F02M 55/04 123/456 |
| 6,513,501 B1* | 2/2003 | Schwegler | F16L 55/0332 123/463 |
| 6,901,914 B1* | 6/2005 | Becene | F02M 69/465 123/456 |
| 7,146,700 B1* | 12/2006 | Darrah | B21D 26/033 29/419.2 |
| 7,493,892 B1* | 2/2009 | Sims, Jr. | F02M 55/025 123/456 |
| 7,694,664 B1* | 4/2010 | Sims, Jr. | F16L 55/053 123/456 |
| 2001/0042538 A1* | 11/2001 | Rossi | F02M 69/465 123/456 |
| 2003/0084878 A1* | 5/2003 | Treusch | F16L 55/035 123/456 |
| 2003/0106535 A1* | 6/2003 | Zdroik | F02M 69/465 123/456 |
| 2003/0111055 A1* | 6/2003 | Miandoab | F02M 55/04 123/456 |
| 2003/0111056 A1* | 6/2003 | Miandoab | F02M 55/04 123/456 |
| 2003/0221672 A1* | 12/2003 | Zdroik | F02M 69/465 123/456 |
| 2003/0230282 A1* | 12/2003 | Braun | F02M 69/465 123/456 |
| 2004/0144367 A1* | 7/2004 | Braun | F02M 55/04 123/456 |
| 2006/0137656 A1* | 6/2006 | Zdroik | F02M 69/465 123/456 |
| 2008/0087253 A1* | 4/2008 | Cvengros | F02M 37/0041 123/457 |
| 2008/0142105 A1* | 6/2008 | Zdroik | F02M 55/025 138/30 |
| 2016/0298581 A1* | 10/2016 | Nah | F02M 55/04 |
| 2017/0023165 A1* | 1/2017 | Fujita | F16L 55/04 |
| 2020/0200130 A1* | 6/2020 | Guzman Escalante | F16F 15/02 |

* cited by examiner

FUEL DISTRIBUTOR FOR INTERNAL COMBUSTION ENGINES

CROSS-REFERENCE TO RELATED APPLICATIONS

The present application claims priority under 35 U.S.C. § 119 to DE 10 2018 209 787.9, filed in the Federal Republic of Germany on Jun. 18, 2018, the content of which is hereby incorporated by reference herein in its entirety.

FIELD OF THE INVENTION

The present invention relates to a fuel distributor, especially a fuel rail for mixture-compressing, spark-ignition internal combustion engines. In particular, the invention relates to the field of fuel injection systems of motor vehicles where fuel is injected directly into combustion chambers of an internal combustion engine.

BACKGROUND

German Patent 10 2014 205 179 A1 describes a fuel rail for an internal combustion engine. The known fuel rail features an elongated housing having a cavity, a fuel inflow into the cavity and at least two fuel outflows from the cavity for one fuel injector each. In that case, disposed in the cavity is a body which has one groove that connects the two fuel outflows to each other, and one groove radially encircling the body in the area of the fuel inflow. The body having the two grooves is used as an insert which ensures a direct supply of fuel from a pump to the injectors. The body can have an inner volume which is used for damping, but is not located in the direct fuel flow.

The fuel rail known from DE 10 2014 205 179 A1 has the disadvantage that the insert is costly to produce, since it is realized as a thick-walled pipe having grooves. In addition, the known fuel rail is restricted to a radial feed of fuel, resulting in a limited field of application.

SUMMARY

The fuel distributor according to the present invention and the method of producing a fuel distributor according to the present invention have an advantage of permitting improved design and mode of functioning.

In particular, a cost-effective and/or easy-to-produce possibility can be realized in order to achieve improved injection in combination with good damping behavior. In addition, the fuel distributor can be produced inexpensively.

The proposed fuel distributor is particularly suited for the injection of a mixture, the mixture composition being intended to vary during operation. In particular, direct injection of water can be realized, where water in an emulsion with at least one fuel, especially gasoline, is injected into combustion chambers of an internal combustion engine. In this case, the water can be supplied to the fuel upstream of or in a high-pressure pump, and conveyed together with the fuel via the fuel distributor to high-pressure injection valves.

In this connection, the composition of the mixture, especially of the emulsion, can vary during operation. For example, the addition of water can be necessary or desired only in a certain map area. For instance, water or a greater content of water can be desired at high speed and/or high load. When this map area is left, e.g., in the case of an overrun fuel cutoff, then it is advantageous if the proportion of water injected is able to be reduced rapidly and, in particular, goes quickly again towards zero. For this, a brief delay time is necessary between the addition of the water upstream of or in the high-pressure pump and its injection via the high-pressure injection valves. In principle, the effect of the volume of the fuel distributor is to increase this delay time. However, by subdividing the inner space of the main body into at least one inflow region and a damping region, it is possible to shorten the delay time, accompanied by continued damping, especially damping of pressure pulsations. Owing to the dividing wall, the hydraulic volume between a high-pressure inlet and the two or more high-pressure outlets can be kept small, but a greater hydraulic damping volume is able to be realized.

For example, if, in the case of a mixture-compressing, spark-ignition internal combustion engine, a switchover is made from a pure gasoline injection to an injection of gasoline and water, then because of the small-volume inflow region, the cooling effect of the water component sets in quickly. The characteristic that the inflow region is small-volume is to be understood here to the effect that it encompasses as small a hydraulic volume as possible, thereby permitting a rapid reaction time. In this manner, enrichment for cooling at high loads can be avoided, without components of the engine thereby being damaged. The cooling effect, which is obtained by the evaporation of water, also permits better filling of the combustion chamber. In addition, higher compression and therefore an increase in efficiency can be made possible, since the tendency to knock is able to be reduced.

The dividing wall is formed advantageously with openings, particularly boreholes, resulting in a beneficial connection of the inflow region to the damping region. The dividing wall can be formed here during the manufacturing process by a metal sheet perforated at specific spacings. During manufacture, such a perforated sheet can be fed continuously with at least one further metal sheet for working in the shaping processing step. Continuous manufacture is thereby enabled, resulting in low manufacturing costs. At the same time, simple and cost-effective adaptation to different application cases is also possible. For example, the cutting-to-length can be carried out in terms of one or more desired lengths. Furthermore, if desired, openings for high-pressure connections can already be predetermined in the supplied metal sheet, which simplifies a finishing operation. In addition, the main body can take the form of a tubular main body having at least one inner dividing wall as well as a predefinable outer profile.

For reliable operation, it is also necessary that the dividing wall be fixedly positioned, since otherwise, because of pressure differences in the inner space that can occur, e.g., due to non-continuous delivery by a high-pressure pump, it can move or not be able to withstand the stresses during operation. In this connection, specifically the occurrence of vibrations in the dividing wall and therefore noise generation should be prevented. The dividing wall can be formed advantageously by a metal sheet integrated into the main body in such a way that no additional and time-consuming joining processes are necessary. In contrast to the proposed means for attaining the objective, it is time-consuming, for example, to join a dividing body, inserted into a tubular main body, to the main body with material-, form-, or force locking. As opposed to dividing the volume over two tubes, for example, which are connected to each other via high-pressure lines or the like, a substantial cost savings can likewise be achieved, since as a rule, such tubes represent one of the most expensive single parts of a fuel distributor.

In particular, according to an example embodiment, shaping and joining processing steps are carried out in such a way that continuous production of the joined metal sheets is made possible, and a plurality of main bodies are cut to length from the joined metal sheets, yielding an advantage of facilitating cost-effective manufacture of a main body, in which the dividing wall is integrated into the main body. In doing so, it is possible to save on processing steps that are costly from the standpoint of manufacturing technology. In particular, a separate joining of one profile forming the dividing wall, to one or more further profiles can be avoided.

In an example, first and second profiles form a rectangular tube and a third profile is formed as an L-profile that is disposed in an inner space of the rectangular tube, yielding an advantage that the inner space can be split into two volumes of different size. In particular, the volume of the inflow region can thereby be optimized. For example, the volume of the inflow region can be selected to be small enough that a sufficiently short delay time results when changing the composition of the mixture of gasoline and water. Moreover, beneficial hydraulic conditions are obtained in this manner, whereby hydraulic vibrations can additionally be damped effectively via the volume of the damping region.

It is especially advantageous if the outer wall of the main body is formed by at least two half-profiles. In particular, half-round profiles, especially semicircular profiles, as well as rectangular and/or bent U-profiles are suitable as half-profiles. A combination of two different half-profiles can also be used here. The profile forming the dividing wall can be disposed in advantageous manner, particularly between two half-profiles. If two half-profiles, dimensioned differently in cross-section, are used, then different volumes can be formed expediently in the inner space, which are separated by the dividing wall. However, in this and other designs, the dividing wall can have one or more openings that enable a beneficial connection of the damping region to the inflow region.

In the case of a modified design, other possibilities can also be provided additionally or alternatively for connecting the inflow region to the damping region. For example, such a connection can also be realized at end pieces of the fuel distributor that close off the tubular main body on both sides. Depending on the design, it is also conceivable that a metal sheet forming the dividing wall is notched sectionally on one or both long sides. At such notches, the dividing wall then does not extend up to an inner wall of the tubular main body, so that in each case a hydraulic connection results there between the inflow region and the damping region.

In an example, a third profile is formed as an H-profile and is disposed between the first and second profiles, providing an advantage that the dividing wall can be formed by the H-profile. For example, the first profile and the second profile can thereby be realized in simplified fashion. In addition, this embodiment permits greater freedom in dimensioning the dividing wall. In particular, joining elements such as a weld seam or soldering seam are no longer realized directly on the dividing wall in this design.

The profiles of which the main body is formed and which can be shaped expediently out of metal sheets, can be joined advantageously to each other by a material-locking joining process, especially welding or inductive soldering. In this manner, an example embodiment can be realized where the main body is made up of at least two profiles joined to one another with material locking.

Preferred example embodiments of the present invention are explained in greater detail in the following description with reference to the attached drawing, in which corresponding elements are provided with identical reference numerals.

DETAILED DESCRIPTION

Figure 1:
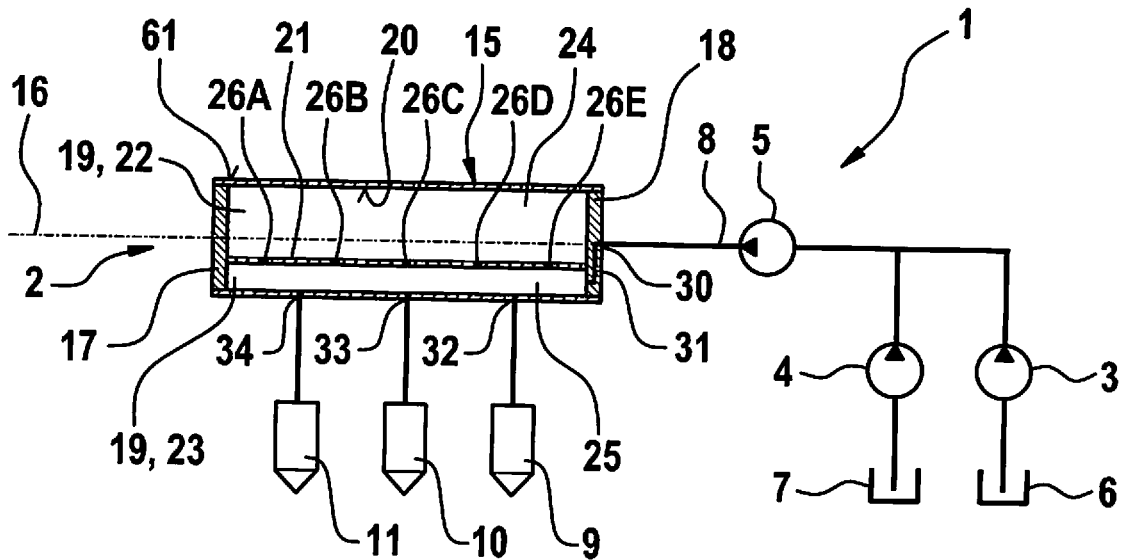
FIG. 1 schematically illustrates a fuel injection system with a fuel distributor, according to an example embodiment of the present invention.

FIG. 1 shows a fuel injection system 1 having a fuel distributor 2 in a schematic representation according to a first example embodiment. In this example embodiment, fuel injection system 1 has a fuel pump 3 and a metering unit 4 taking the form of fore-pump. In addition, a high-pressure pump 5 is provided. Fuel pump 3 delivers liquid fuel, especially gasoline, from a tank 6 to high-pressure pump 5. Metering unit 4 is used for the intermittent metering of water from a reservoir 7 into the delivered fuel. In this example embodiment, the metering takes place upstream of high-pressure pump 5. In a modified design, the metering can also take place at high-pressure pump 5. Depending on the operating state, the liquid fuel or a mixture of liquid fuel and water is then conveyed in a line section 8 provided between fuel distributor 2 and high-pressure pump 5. In this context, depending on the design, a positive content of water can be permanently predetermined in the mixture, or can be varied over time. If the metering via metering unit 4 is switched off, then the portion of water in the mixture preferably disappears down to zero.

Fuel distributor 2 is used to store and distribute fuel to fuel injectors 9, 10, 11, and thereby reduces the pressure fluctuations or pulsations. Fuel distributor 2 can also be used to damp pressure pulsations which can occur upon the switching of fuel injectors 9-11. Fuel distributor 2 is implemented in such a way that, for example, upon switching metering unit 4 on or off, a brief delay time is achieved in terms of the addition of the water upstream of high-pressure pump 5 and the injection of the water via fuel injectors 9-11.

Fuel distributor 2 has a tubular main body 15 that extends along a longitudinal axis 16. For example, end pieces 17, 18 can be affixed to tubular main body 15, which close tubular main body 15 at its two ends. Tubular main body 15 has an inner space 19 that is encompassed by an inner wall 20 of tubular main body 15 and the two end pieces 17, 18.

Tubular main body 15 includes a dividing wall 21 that in this example embodiment, divides inner space 19 into two volumes 22, 23. In this example embodiment, inner space 19 is thereby split into a damping region 24 and an inflow region 25. Preferably, openings 26A-26E are formed in dividing wall 21, that are set apart from each other along longitudinal axis 16 and permit a hydraulic connection between inflow region 25 and damping region 24. Upon the occurrence of pressure pulsations, better damping is thereby attained in inflow region 25. At the same time, volume 23 of inflow region 25 can be predetermined to be small enough that a delay time is sufficiently short.

In this example embodiment, a high-pressure inlet 30 is located axially at end piece 18. In end piece 18, a channel is formed that allows the supplied fuel to flow directly into inflow region 25. High-pressure outlets 32, 33, 34 lead directly into inflow region 25. Viewed along longitudinal axis 16, high-pressure outlets 32, 33, 34 branch off one after the other from inflow region 25, in order to guide the fuel to fuel injectors 9 through 11.

When the operating mode is changed in order to additionally meter in water from reservoir 7 via metering unit 4, then downstream of high-pressure pump 5, the mixture of fuel and water arrives directly in inflow region 25. Since volume 23 of inflow region 25 is selected to be sufficiently small, a delay time until fuel injectors 9-11 inject the mixture having the predetermined water content is brief.

Quick changes to other operating modes can likewise be obtained. For example, the content of water can also be reduced again with a short delay time. In particular, the water content can also be reduced at least essentially to zero with a short delay time. By rapidly increasing the water content, it is possible to save fuel at high load, for example, since no enrichment of the fuel-air mixture is necessary or such an enrichment can at least be reduced. In the case of a reduction in load, particularly upon a change to overrun conditions, by rapidly reducing the water content, unwanted cooling of the combustion chamber can be prevented.

Figure 2:
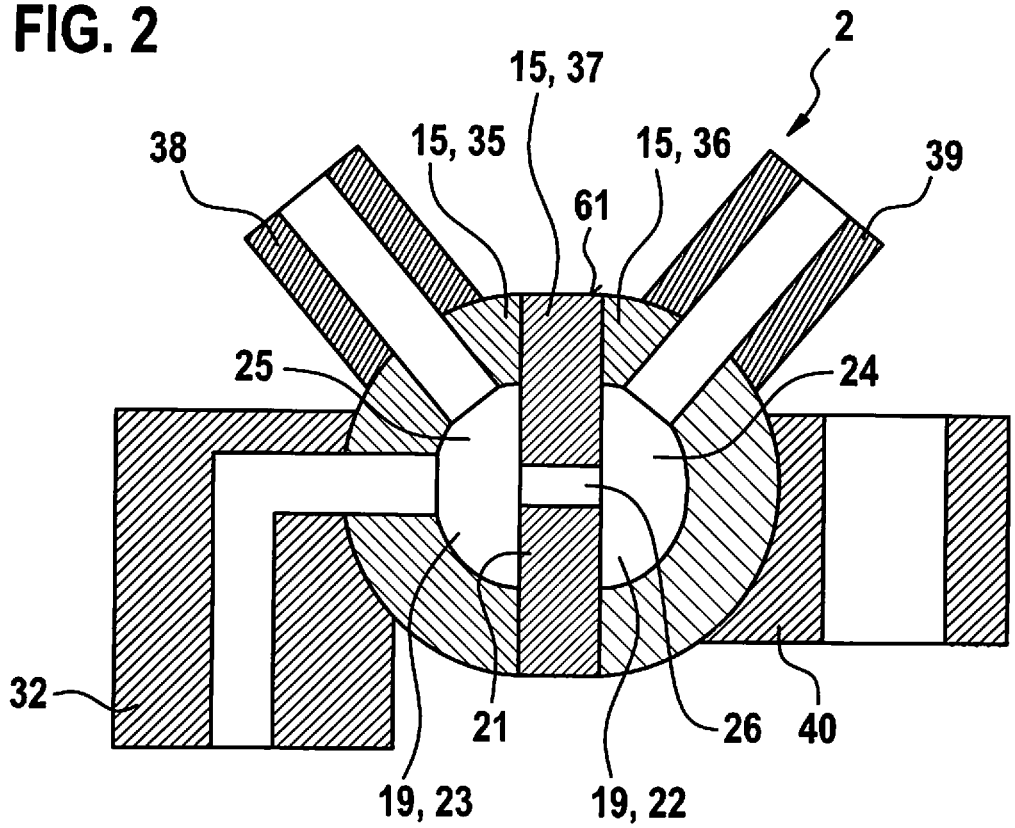
FIG. 2 schematically illustrates a sectional view of the fuel distributor of FIG. 1, according to an example embodiment of the present invention.

FIG. 2 shows fuel distributor 2, depicted in FIG. 1, in a schematic sectional view according to an example embodiment. Tubular main body 15 is made up of a first profile 35, a second profile 36 and a third profile 37. In this case, by preference, profiles 35-37 are formed out of metal sheets. First profile 35 and second profile 36 take the form of half-profiles 35, 36. Third profile 37 is formed as flat profile 37. First profile 35 and second profile 36 in this example embodiment are formed as U-profiles 35, 36 and especially as half-round profiles 35, 36. Connection 32 is shown by way of example in FIG. 2, which in this example embodiment, takes the form of a cup. Correspondingly, connections 33, 34 can be formed as cups. In addition, a high-pressure connecting piece 38 can be provided which can be used, for example, as an alternative to high-pressure inlet 30 for the delivery of fuel. Moreover, a sensor connection 39 is provided, via which the pressure within inner space 19 is able to be measured. In addition, a retainer 40 is affixed to main body 15, which is used for securing on a cylinder head or the like. One or more retainers can be provided here.

In this example embodiment, dividing wall 21, which is formed on flat profile 37, divides inner space 19 into two volumes 22, 23 of equal size. Damping region 24 is thereby formed on one side of dividing wall 21, and inflow region 25 is formed on the other side of dividing wall 21. Inflow region 25 is connected to damping region 24 via one or more openings 26.

FIG. 2 illustrates, in exemplary manner, a possible design, where a suitable configuration along axis 16 is selected in terms of the specific application case. In particular, it is advantageous if, as viewed along longitudinal axis 16, retainers 40 are offset relative to connections 32-34. Correspondingly, preferably an offset placement of high-pressure connecting piece 38 and sensor connection 39 is realized. Openings 26A-26E (FIG. 1), of which one denoted as opening 26 is shown by way of example, are likewise provided in suitable number and placement on dividing wall 21. Such openings 26, 26A-26E can also be disposed here in a possibly different manner and preferably distributed over dividing wall 21 in such a way that high stability of dividing wall 21 results.

The hydraulic volume of inner space 19 can be divided by differently shaped profiles 35-37, of which two or more profiles 35-37 are used, into volumes 22, 23 that are interconnected via openings 26, 26A-26E. Such profiles 35-37 can be shaped in suitable manner, particularly as C-, L-, T-, U- and H-profiles. An H-profile corresponds here to a double-T profile. Preferably, such profiles 35-37 are shaped out of metal sheets that are made of suitable materials, particularly rail materials, and are joined to each other with material locking. In particular, austenitic high-grade steels are suitable as appropriate materials for the metal sheets. A welding process or inductive soldering are especially suitable for the form-locking joining. In an example embodiment, metal sheets 45, 46 (FIG. 3) can be worked continuously, whereby at least one shaping processing step and at least one joining processing step are used, as described with reference to FIG. 3, as well.

Figure 3:
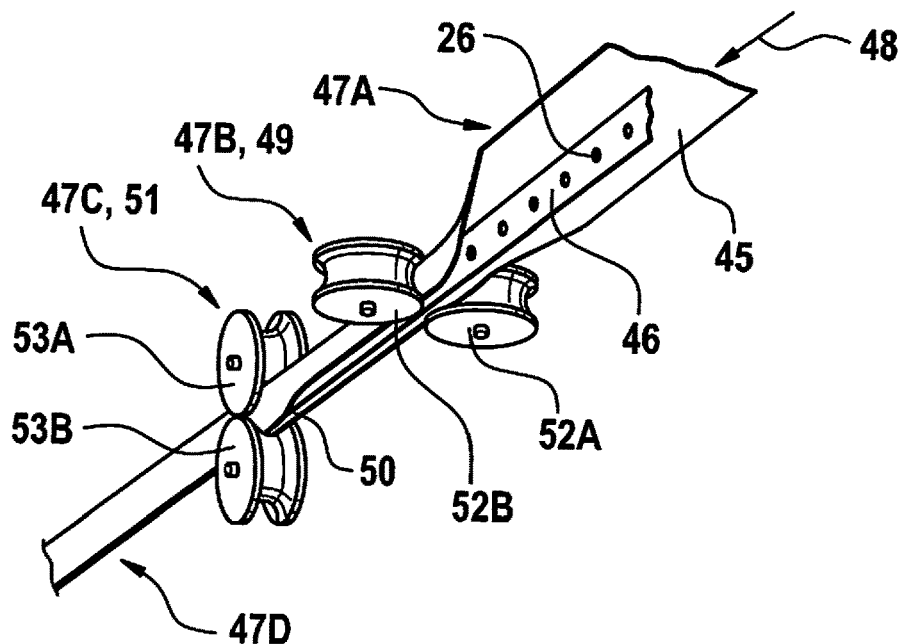
FIG. 3 schematically represents, in part, a manufacturing process to elucidate a method for manufacturing a main body for a fuel distributor, according to an example embodiment of the present invention.

FIG. 3 shows a schematic representation, in part, of a manufacturing process to elucidate an example embodiment of a method for manufacturing a main body 15 for a fuel distributor 2. Using this method, a large number of main bodies 15 can be produced expediently in one continuous manufacturing process. Two metal sheets 45, 46 are shown here by way of example, a design for more than two metal sheets 45, 46 also being obtained in corresponding manner. In this example embodiment, metal sheets 45, 46 are fed as at least essentially flat sheets 45, 46, as illustrated in an area 47A. The feed takes place in a direction 48. In a processing area 47B, a shaping processing step 49 is carried out in this example embodiment, which is based on a section rolling method and/or a roll bending method. One or more further shaping processing steps can also precede this shaping processing step 49. Thus, for example, one of metal sheets 45, 46 or a further sheet already in a suitably shaped profile can be supplied in an area 47A. In addition, in this example embodiment, openings 26 are formed in certain sections in flat sheet 46, of which opening 26 is identified by way of example.

In this example embodiment, shaping processing step 49 is carried out in such a way that sheet 45 is bent continuously to form a circular profile. In so doing, a gap 50 remains.

A joining processing step 51 is carried out in a processing area 47C. In joining processing step 51, metal sheet 45, bent into the circular profile, is closed with material locking at remaining gap 50. In so doing, a material-locking joint can be realized with metal sheet 46 at the same time. The material-locking joint can be formed by welding, for example.

In FIG. 3, shaping processing step 49 is realized by forming rolls 52A, 52B. Further devices can also be used here, particularly a blower. Joining processing step 51 is illustrated by welding rolls 53A, 53B.

Thus, metal sheets 45, 46 can be shaped continuously by section rolling and/or roll bending. In addition, a material-locking joint can be realized continuously. The principle illustrated using FIG. 3 can be used to convey a suitable number of metal sheets together, shape them and subsequently join them to each other. In an area 47D, the welded tube is then cut to length to form main body 15. Thus, a great number of main bodies 15 can be produced inexpensively. In doing so, great flexibility is obtained, since it is possible to cut to the length desired in each case. Moreover, as a rule, manufacturing costs are lower than when producing seamless tubes, which are produced in a discontinuous process.

In addition, metal sheets 45, 46 can be preprocessed in suitable manner, e.g., by perforating metal sheet 46 at regular intervals to form openings 26.

By the one-sided mounting of high-pressure connecting piece 38 and valve cups 32, which can be accomplished, e.g., by copper hard-soldering, welding, or screw-connection, together with the volume proportioning, a short response time of fuel injection system 1 can be realized with a nevertheless available buffer volume in desired geometry. The combination of identical or different profiles here facilitates adaptation to the geometric installation conditions as appear, for example, in an engine compartment, as well as suitable division of inner space 19 into several volumes 22, 23. Possible designs are also represented using FIGS. 4-7.

Figure 4:
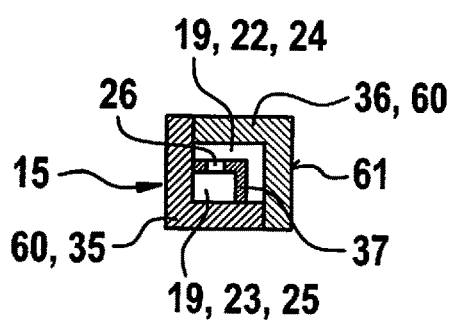
FIG. 4 illustrates a main body of the fuel distributor shown in FIG. 2, according to another example embodiment of the present invention.

FIG. 4 shows a main body 15 of fuel distributor 2, depicted in FIG. 2, according to a second example embodiment, in which first profile 35 and second profile 36 each takes the form of L-profiles, whereby a rectangular tube 60 is obtained. Third profile 37 is likewise shaped as an L-profile. In this case, an inflow region 25 can be realized having a volume 23 which is smaller than a volume 22 of damping region 24.

Figure 5:
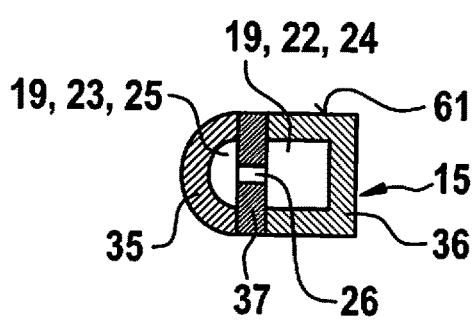
FIG. 5 illustrates a main body of the fuel distributor shown in FIG. 2, according to another example embodiment of the present invention.

FIG. 5 shows a main body 15 according to a third example embodiment. In this example embodiment, main body 15 is formed of a half-round profile 35 and a U-profile 36 as well as a flat profile 37. Volume 23 of inflow region 25 is predetermined in this example embodiment to be smaller than volume 22 of damping region 24.

Figure 6:
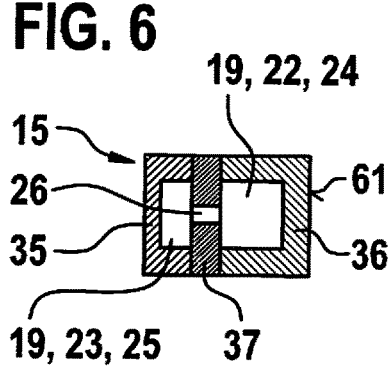
FIG. 6 illustrates a main body of the fuel distributor shown in FIG. 2, according to another example embodiment of the present invention.

FIG. 6 shows a main body 15 that is made up of U-profiles 35, 36 of different geometry, as well as a flat profile 37. Consequently, volume 23 of inflow region 25 can be predetermined to be smaller than volume 22 of damping region 24.

Figure 7:
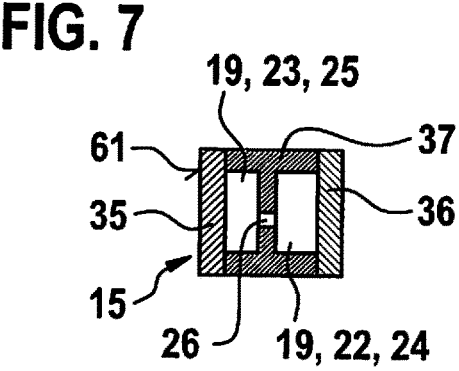
FIG. 7 illustrates a main body of the fuel distributor shown in FIG. 2, according to another example embodiment of the present invention.

FIG. 7 shows a main body 15 according to a fifth example embodiment. In this example embodiment, first profile 35 and second profile 36 take the form of flat profiles, while third profile 37 is formed as an H-profile. By suitable formation of H-profile 37, it is possible to predetermine volume 23 of inflow region 25 to be smaller than volume 22 of damping region 24.

By a suitable formation, volumes 22, 23 can also be predetermined to be equal.

In the example embodiments described on the basis of FIGS. 2 and 5-7, an outer side 61 of main body 15 is formed by all three profiles 35-37. In the design according to FIG. 4, the outer side is formed by profiles 35, 36, while third profile 37 is located within rectangular tube 60.

The present invention is not limited to the example embodiments described.

What is claimed is:

1. A fuel distributor, comprising:
   a tubular main body;
   wherein the tubular main body includes a plurality of high-pressure outlets, at least one dividing wall that at least substantially separates an inflow region from a damping region within the main body,
   wherein the tubular main body is made up of at least two profiles that are joined to one another, and
   wherein the at least two profiles includes (a) a first profile and a second profile that form a rectangular tube, and
   (b) a third profile formed as an L-profile that is disposed in an inner space of the rectangular tube.

2. The fuel distributor of claim 1, wherein the fuel distributor is for a fuel rail for a mixture-compressing spark-ignition internal combustion engine.

3. The fuel distributor of claim 1, wherein the at least two profiles includes at least first, second, and third profiles, and wherein an outer side of the main body is formed by at least the first and second profiles, and the dividing wall is formed by the third profile.

4. A fuel distributor, comprising:
   a tubular main body;
   wherein the tubular main body includes a plurality of high-pressure outlets, at least one dividing wall that at least substantially separates an inflow region from a damping region within the main body,
   wherein the tubular main body is made up of at least two profiles that are joined to one another,
   wherein the at least two profiles includes at least first, second, and third profiles, and wherein an outer side of the main body is formed by at least the first and second profiles, and the dividing wall is formed by the third profile, and
   wherein the outer side of the main body is formed partially by the third profile.

5. The fuel distributor of claim 4, wherein the third profile is formed as an H-profile and is disposed between the first and second profiles.

6. The fuel distributor of claim 3, wherein the first and second profiles are each formed as a rectangular and/or bent U-profile, and the third profile is formed as a flat profile that is disposed between the first and second profiles.

7. The fuel distributor of claim 1, wherein the main body is made up of at least two profiles which are joined to one another other with material locking.

8. A method for producing a main body for a fuel distributor, the method comprising:
   jointly working at least two metal sheets using at least one shaping processing task of a section-rolling and/or roll-bending process, by which at least one shaping processing task at least one of the metal sheets is shaped into a non-flat profile; and
   performing at least one joining processing task that joins the at least two metal sheets to each other, wherein, after the at least one shaping processing task and the joining processing task, one of the at least two metal sheets is formed as a dividing wall for the main body.

9. The method of claim 8, wherein the at least one shaping processing task and the at least one joining processing task are carried out so that continuous production of the joined metal sheets is made possible, and a plurality of main bodies are cut to length from the joined metal sheets.

10. A fuel distributor, comprising:
    a tubular main body having a plurality of high-pressure outlets;
    wherein the tubular main body is made by performing the following:
       jointly working at least two metal sheets using at least one shaping processing task of a section-rolling and/or roll-bending process, by which at least one shaping processing task at least one of the metal sheets is shaped into a non-flat profile; and
       performing at least one joining processing task that joins the at least two metal sheets to each other, wherein, after the at least one shaping processing task and the joining processing task, one of the at least two metal sheets is formed as a dividing wall for the main body.

* * * * *